US011978409B2

(12) United States Patent
Liu

(10) Patent No.: US 11,978,409 B2
(45) Date of Patent: May 7, 2024

(54) BACKLIGHT DRIVING CIRCUIT CAPABLE OF ALLEVIATING MOTION STREAK EFFECT AND RELATED LIQUID CRYSTAL DISPLAY DEVICE

(71) Applicant: TCL China Star Optoelectronics Technology Co., Ltd., Guangdong (CN)

(72) Inventor: Jinfeng Liu, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 282 days.

(21) Appl. No.: 17/281,633

(22) PCT Filed: Mar. 30, 2021

(86) PCT No.: PCT/CN2021/083821
§ 371 (c)(1),
(2) Date: Mar. 31, 2021

(87) PCT Pub. No.: WO2022/193359
PCT Pub. Date: Sep. 22, 2022

(65) Prior Publication Data
US 2023/0130697 A1 Apr. 27, 2023

(30) Foreign Application Priority Data
Mar. 19, 2021 (CN) ......................... 202110293542.2

(51) Int. Cl.
*G09G 3/34* (2006.01)
*G09G 3/36* (2006.01)

(52) U.S. Cl.
CPC ........... *G09G 3/342* (2013.01); *G09G 3/3648* (2013.01); *G09G 2310/08* (2013.01); *G09G 2320/0257* (2013.01)

(58) Field of Classification Search
CPC .. G09G 3/342; G09G 3/3648; G09G 2310/08; G09G 2320/0257
See application file for complete search history.

(56) References Cited

U.S. PATENT DOCUMENTS

2003/0112205 A1* 6/2003 Yamada ............... G09G 3/3233 345/32
2007/0296651 A1* 12/2007 Kim ..................... G09G 3/3233 345/76

(Continued)

FOREIGN PATENT DOCUMENTS

CN 101093639 12/2007
CN 102768826 11/2012

(Continued)

*Primary Examiner* — Kwang-Su Yang

(57) ABSTRACT

The present disclosure provides a backlight driving circuit and a liquid crystal display device. The backlight driving circuit according to an embodiment of the present application adds a first transistor and a reset signal. The on-off of the second transistor is controlled by the scan signal to charge the storage capacitor, and the on-off of the first transistor is controlled by the reset signal to release the charge in the storage capacitor. The backlight driving circuit of the application can realize the backlight lighting individually row by row and improve the problem of display motion streak effect.

18 Claims, 3 Drawing Sheets

(56) References Cited

U.S. PATENT DOCUMENTS

| | | | | |
|---|---|---|---|---|
| 2009/0251452 | A1* | 10/2009 | Kang | G09G 3/3233 345/82 |
| 2018/0335664 | A1* | 11/2018 | Jiang | G02F 1/133609 |
| 2021/0241704 | A1* | 8/2021 | Pyun | G09G 3/3648 |
| 2022/0093046 | A1* | 3/2022 | Yan | G09G 3/3266 |
| 2022/0223106 | A1* | 7/2022 | Kobayashi | G09G 3/3233 |

FOREIGN PATENT DOCUMENTS

| | | |
|---|---|---|
| CN | 107978280 | 5/2018 |
| CN | 108227287 | 6/2018 |
| CN | 108694914 | 10/2018 |
| CN | 109192150 | 1/2019 |
| CN | 109686320 | 4/2019 |
| CN | 109785800 | 5/2019 |
| CN | 110349532 | 10/2019 |
| CN | 111028767 | 4/2020 |
| CN | 111354319 | 6/2020 |
| CN | 111580304 | 8/2020 |
| CN | 112331151 | 2/2021 |
| KR | 10-0837335 | 6/2008 |
| TW | 558699 | 10/2003 |

* cited by examiner

BACKLIGHT DRIVING CIRCUIT CAPABLE OF ALLEVIATING MOTION STREAK EFFECT AND RELATED LIQUID CRYSTAL DISPLAY DEVICE

RELATED APPLICATIONS

This application is a National Phase of PCT Patent Application No. PCT/CN2021/083821 having International filing date of Mar. 30, 2021, which claims the benefit of priority of Chinese Patent Application No. 202110293542.2 filed on Mar. 19, 2021. The contents of the above applications are all incorporated by reference as if fully set forth herein in their entirety.

FIELD AND BACKGROUND OF THE INVENTION

The application relates to display, in particular to a backlight driving circuit and a liquid crystal display (LCD) device.

An LCD device displays different pictures by controlling twist (deflection) angles of liquid crystal through voltages. However, in applications demanding higher and higher refresh rates, when the liquid crystal is twisted, if the backlight source keeps on before the liquid crystal reaches a steady state, motion streaks would be undesirably precepted by people.

In research and practice of the prior art, the inventor of the present application finds that a passive matrix mini light emitting diode (PM Mini-LED) product is driven by a single point static control mode, that is, backlight sources are turned on with the open cells by scanlines. In this way, a backlight source can be turned on after the liquid crystal reaches the steady state. The twisting of liquid crystal is not perceptible because the backlight source is not turned on during twisting, hence the undesirable motion streak effect can be mitigated.

Backlight sources for active matrix mini light emitting diode (AM Mini-LED), like those in the open cells, are driven by scanlines. When each row (line) of backlight source is scanned, a capacitor is charged. After charging, a thin film transistor (TFT) is turned off to isolate the charged capacitor at a potential that keeps the driving transistor active, so that the LED is kept active. Each row of backlight source is turned on until the next frame is finished. Until then, the TFT is turned on again to reset the capacitor. The described approach is unable to turn off the previous row of LED while turning on a current row of LED. In other words, it is unable to turn on the backlight sources row by row with the open cells. Therefore, it is difficult to improve the motion streak effect problem in active matrix products.

To attend to the described technical issues, the application provides a backlight driving circuit and a liquid crystal display device, allowing the backlight sources to be turned on row by row, so as to mitigate the undesirable motion streak effect when the liquid crystal display device displays.

SUMMARY OF THE INVENTION

A detailed description is given in the following embodiments with reference to the accompanying drawings.

The application provides a backlight driving circuit, which comprises a driving transistor, a first transistor, a second transistor, a storage capacitor and a light emitting device.

The drain electrode of the driving transistor is electrically connected with the light emitting device, the source electrode of the driving transistor is electrically connected with the first node, and the gate electrode of the driving transistor is electrically connected with the second node.

The drain electrode of the first transistor is grounded, the source electrode of the first transistor is electrically connected to the second node, and the gate electrode of the first transistor is connected with a reset signal.

The source electrode of the second transistor is connected with a data signal, the drain electrode of the second transistor is electrically connected with the second node, and the gate electrode of the second transistor is connected with a scan signal.

The first end of the storage capacitor is electrically connected to the first node, and the second end of the storage capacitor is electrically connected to the second node.

The anode of the light emitting device is connected with a power supply signal, and the cathode of the light emitting device is electrically connected with the drain electrode of the driving transistor.

Optional, in some embodiments of the application, the drive timing sequence of the backlight driving circuit includes:

In the scan stage, the data signal is output to the second node, and the driving transistor drives the light emitting device to luminate;

In the reset stage, the charge of the storage capacitor is released to reset the light emitting device.

Alternatively, in some embodiments of the application, in the scan stage, the scan signal is high level and the reset signal is low level.

Alternatively, in some embodiments of the application, in the reset stage, the scan signal is at a low level and the reset signal is at a high level.

Alternatively, in some embodiments of the application, the first transistor, the second transistor and the driving transistor are all low temperature polysilicon thin film transistors, oxide semiconductor thin film transistors or amorphous silicon thin film transistors.

Alternatively, in some embodiments of the application, the light-emitting device is one or more of light-emitting diodes, mini light-emitting diodes, or micro light-emitting diodes.

Correspondingly, the application also provides a backlight driving circuit, including a driving transistor, a first transistor, a second transistor, a storage capacitor, and a light-emitting device, wherein the light-emitting device is one or more of light-emitting diodes, mini light-emitting diodes, and micro light-emitting diodes;

The drain electrode of the driving transistor is electrically connected with the light emitting device, the source electrode of the driving transistor is electrically connected with the first node, and the gate electrode of the driving transistor is electrically connected with the second node;

The drain electrode of the first transistor is grounded, the source electrode of the first transistor is electrically connected to the second node, and the gate electrode of the first transistor is connected with a reset signal;

The source electrode of the second transistor is connected with a data signal, the drain electrode of the second transistor is electrically connected with the second node, and the gate electrode of the second transistor is connected with a scan signal;

The first end of the storage capacitor is electrically connected to the first node, and the second end of the storage capacitor is electrically connected to the second node;

The anode of the light emitting device is connected with a power supply signal, and the cathode of the light emitting device is electrically connected with the drain electrode of the driving transistor;

The drive timing sequence of the backlight driving circuit comprises:

In the scan stage, the data signal is output to the second node, and the driving transistor drives the light emitting device to luminate;

In the reset stage, the charge of the storage capacitor is released to reset the light emitting device.

Optional, in some embodiments of the application, in the scan stage, the scan signal is high level and the reset signal is low level; in the reset stage, the scan signal is low level and the reset signal is high level.

Alternatively, in some embodiments of the application, the first transistor, the second transistor and the driving transistor are all low temperature polysilicon thin film transistors.

Alternatively, in some embodiments of the application, the first transistor, the second transistor and the driving transistor are oxide semiconductor thin film transistors.

Alternatively, in some embodiments of the application, the first transistor, the second transistor and the driving transistor are all amorphous silicon thin film transistors.

Correspondingly, the application also provides a liquid crystal display device, including a backlight module, an array substrate, a color film substrate and a liquid crystal layer arranged between the array substrate and the color film substrate, the backlight module is arranged on the side of the array substrate away from the liquid crystal layer, the backlight module is provided with a plurality of backlight units, and the backlight unit includes a driving transistor, a first transistor, a second transistor, a storage capacitor and a light emitting device;

The drain electrode of the driving transistor is electrically connected with the light emitting device, the source electrode of the driving transistor is electrically connected with the first node, and the gate electrode of the driving transistor is electrically connected with the second node;

The drain electrode of the first transistor is grounded, the source electrode of the first transistor is electrically connected to the second node, and the gate electrode of the first transistor is connected with a reset signal;

The source electrode of the second transistor is connected with a data signal, the drain electrode of the second transistor is electrically connected with the second node, and the gate electrode of the second transistor is connected with a scan signal;

The first end of the storage capacitor is electrically connected to the first node, and the second end of the storage capacitor is electrically connected to the second node;

The anode of the light emitting device is connected with a power supply signal, and the cathode of the light emitting device is electrically connected with the drain electrode of the driving transistor.

Optional, in some embodiments of the application, the drive timing sequence of the backlight driving circuit includes a scan stage and a reset stage. In the scan stage, the nth row of liquid crystal in the liquid crystal layer deflects. After the nth row of liquid crystal deflects stably, the backlight driving circuit drives the backlight unit in the corresponding row of the backlight module to luminate. In the reset stage, the backlight driving circuit drives the backlight unit in the corresponding row of the backlight module to luminate, release the charge stored in the backlight driving circuit, and close the backlight unit corresponding to the nth row liquid crystal, where n is a positive integer greater than 1.

Optional, in some embodiments of the present application, when the backlight driving circuit corresponding to the n+1-th row of liquid crystal is in the scan stage, the backlight driving circuit corresponding to the nth row of liquid crystal is in the reset stage.

Alternatively, in some embodiments of the application, each row of the liquid crystal cells corresponds to 80 to 120 rows of the backlight unit.

Optional, in some embodiments of the application, the drive timing sequence of the backlight driving circuit includes:

In the scan stage, the data signal is output to the second node, and the driving transistor drives the light emitting device to luminate;

In the reset stage, the charge of the storage capacitor is released to reset the light emitting device.

Alternatively, in some embodiments of the application, in the scan stage, the scan signal is high level and the reset signal is low level.

Alternatively, in some embodiments of the application, in the reset stage, the scan signal is at a low level and the reset signal is at a high level.

Alternatively, in some embodiments of the application, the first transistor, the second transistor and the driving transistor are all low temperature polysilicon thin film transistors, oxide semiconductor thin film transistors or amorphous silicon thin film transistors.

Alternatively, in some embodiments of the application, the light-emitting device is one or more of light-emitting diodes, mini light-emitting diodes, or micro light-emitting diodes.

The backlight driving circuit adopted in the application adds a first transistor and a reset signal. The on-off of the second transistor is controlled by the scan signal to charge the storage capacitor, and the on-off of the first transistor is controlled by the reset signal to release the charge in the storage capacitor. The liquid crystal display device adopting the backlight driving circuit of the application can realize the backlight lighting individually row by row, and improve the display motion streak effect problem of the liquid crystal display device.

BRIEF DESCRIPTION OF THE SEVERAL VIEWS OF THE DRAWINGS

In order to more clearly illustrate the technical solution in the application, the following brief introduction of the drawings in the description of the embodiment are presented. It is obvious that the drawings in the description below are merely some of the embodiments of the application. For those skilled in the art, variable drawings can be easily deduced from the present drawings without endeavors of additional creativity.

DESCRIPTION OF SPECIFIC EMBODIMENTS OF THE INVENTION

Figure 1:
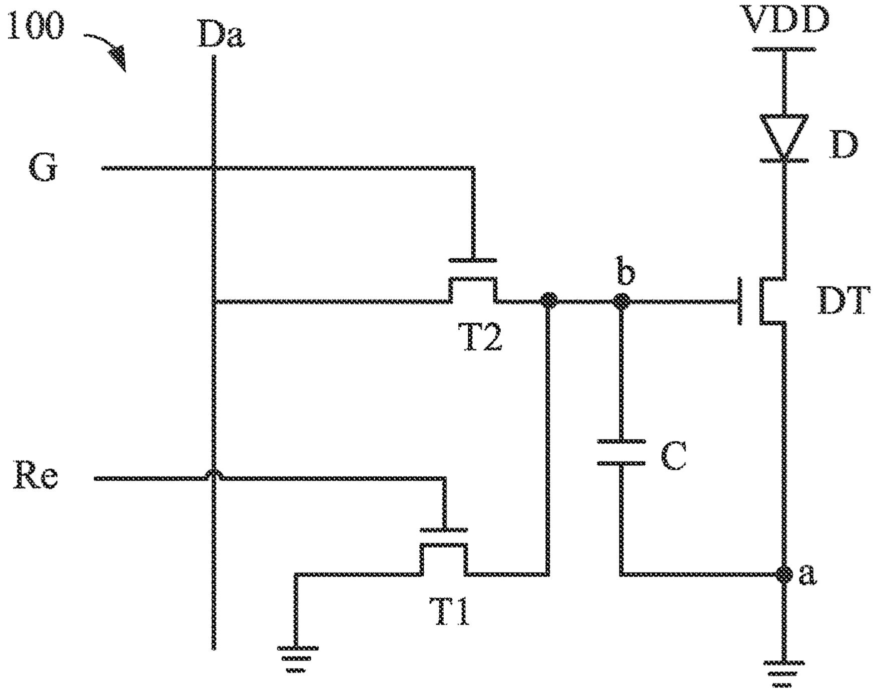
FIG. 1 is a circuit diagram of the backlight driving circuit according to an embodiment of the present application.

The following description is of the best-contemplated mode of carrying out the invention. This description is made for the purpose of illustrating the general principles of the invention and should not be taken in a limiting sense. The scope of the invention is best determined by reference to the appended claims.

A technical solution in the application will be described clearly and completely in combination with the drawings encompassed with the application. Obviously, the described embodiments are merely part of the embodiments in the application, not all of them. Based on the embodiments in the application, different embodiments deduced by those skilled in the art without additional endeavors of creativity shall all be protected under the claimed scope of the application. In addition, it should be understood that specific embodiments described herein are merely used to illustrate and explain the present application and are not used to limit the present application. In the present application, without any explanation to the contrary, the used orientation words such as "up" and "down" generally refer to the up and down in the actual use or working state of the device, specifically the drawing surface direction in the drawings; while "inside" and "outside" refer to the outline of the device.

It should be noted that since the source electrode and the drain electrode of a transistor used in the application are symmetrical, the source electrode and the drain electrode are interchangeable. In the present application, in order to distinguishingly describe the two electrodes of the transistor except for the gate electrode, one electrode is called the source electrode, and the other electrode is called the drain electrode. In addition, the transistors used in the application may include P-type transistors and/or N-type transistors, wherein the P-type transistors are turned on when the gate electrode is at a low level, and cut off when the gate electrode is at a high level. Conversely, the N-type transistors are turned on when the gate electrode is at the high level, and cut off when the gate electrode is at the low level.

The application provides a backlight driving circuit and a liquid crystal display device. The following is a detailed description. It should be noted that the order or the following description of the embodiments is not taken as the limitation of the preferred order of the embodiments.

Please refer to FIG. 1, wherein a circuit diagram of the backlight driving circuit is presented according to an embodiment of the present application. The embodiment of the application provides a backlight driving circuit 100, including a driving transistor DT, a first transistor T1, a second transistor T2, a storage capacitor C and a light emitting device D. The light emitting device D can be a light emitting diode (LED), a mini light emitting diode (Mini LED) or a micro light emitting diode (micro LED).

A drain electrode of the driving transistor DT is electrically connected with the light emitting device D. A source electrode of the driving transistor DT is electrically connected with a first node a. A gate electrode of the driving transistor DT is electrically connected to a second node b. A drain electrode of the first transistor T1 is grounded. A source electrode of the first transistor T1 is electrically connected to the second node b. A gate electrode of the first transistor T1 is connected with a reset signal Re. A source electrode of the second transistor T2 is connected with the data signal Da. A drain electrode of the second transistor T2 is electrically connected to the second node b. A gate electrode of the second transistor T2 is connected with a scan signal G. The first end of the storage capacitor C is electrically connected to the first node a. The second end of the storage capacitor C is electrically connected to the second node b. The anode of the light emitting device D is connected with a power supply signal VDD. The cathode of the light emitting device D is electrically connected with the drain electrode of the driving transistor DT.

Specifically, the driving transistor DT is used to control a current flowing through the light emitting device D. The first transistor T1 is used to release charges in the storage capacitor C under the control of the reset signal Re. The second transistor T2 is used to output the data signal Da to the second node b under control of the scan signal G.

In a backlight driving circuit 100 according to an embodiment of the present application, the first transistor T1 and a reset signal Re are added. The on/off state of the second transistor T2 is controlled by the scan signal G to charge the storage capacitor C, and the on/off state of the first transistor T1 is controlled by the reset signal Re to release the charge in the storage capacitor C. With the backlight driving circuit 100 proposed in the embodiment of the application, backlight sources can be individually turned on row by row, and the problem of motion streak during display can be mitigated.

In some embodiments, the drive transistor DT, the first transistor T1, and the second transistor T2 are low temperature polysilicon thin film transistors, oxide semiconductor thin film transistors, or amorphous silicon thin film transistors. All the transistors in the backlight driving circuit 100 according to an embodiment of the present application, are transistors of the same type, so as to avoid the influence of the difference between different types of transistors on the backlight driving circuit 100.

On a conventional backlight driving circuit having a 2T1C (two transistors and one storage capacitor) based structure, a first transistor T1 is added as an embodiment of the application. The first transistor T1 can release the charge in the storage capacitor C under control of the reset signal Re. The backlight driving circuit 100 proposed in the embodiment has a 3T1C based structure to drive the light emitting device D. Less components are required in the design which also benefits from simplicity, stability, and reduced cost. Furthermore, the embodiment of the application only needs to add one transistor for control of the charge in the storage capacitor that enables row by row lighting, hence the circuit design is optimized with a simplified circuit structure.

Figure 2:
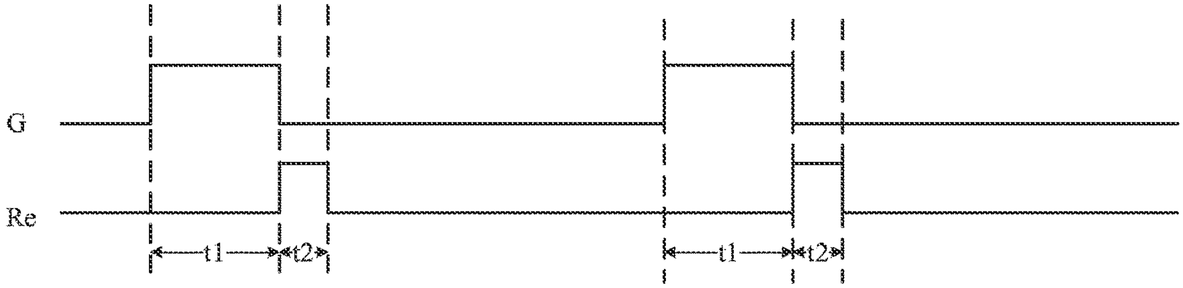
FIG. 2 is a sequence diagram of the backlight driving circuit according to an embodiment of the present application.

Please refer to FIG. 2, wherein a sequence diagram of the backlight driving circuit is presented according to an embodiment of the present application. The drive timing sequence of the backlight driving circuit 100 includes a scan stage T1 and a reset stage T2. The combination of the scan signal G and the reset signal Re successively corresponds to different stages of the backlight driving circuit 100.

Specifically, in the scan stage T1, the data signal Da is output to the second node b, the driving transistor DT is turned on to drive the light-emitting circuit, causing the light-emitting device D to luminate. In the reset stage T2, charges in the storage capacitor C are released to reset the light emitting device D.

Figure 3:
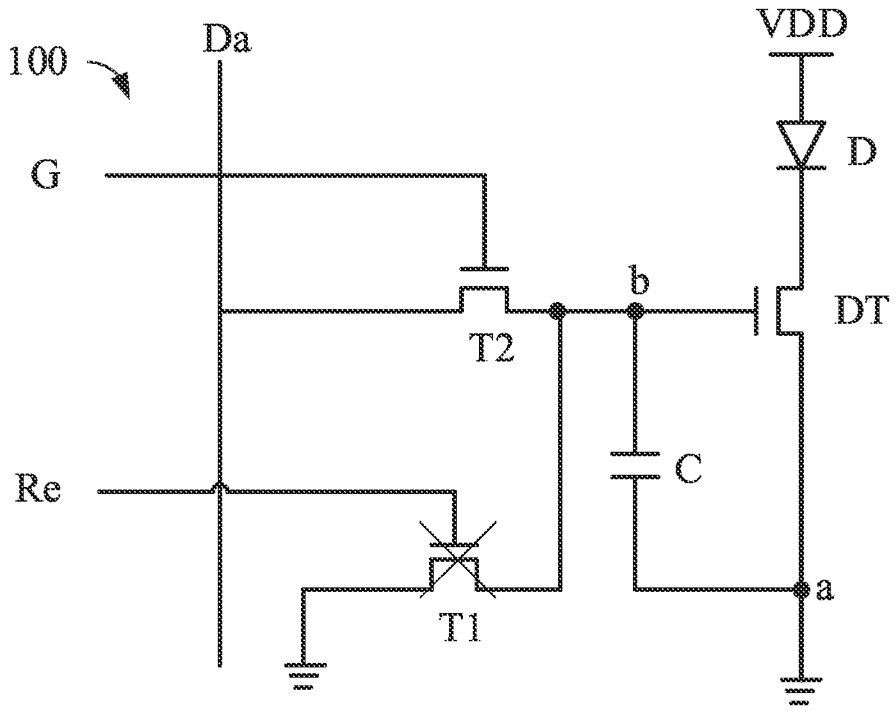
FIG. 3 is a path diagram of the scan stage of the backlight driving circuit according to the embodiment in the driving sequence shown in FIG. 2.

In some embodiments, in the scan stage T1, a scan signal G is at a high level and the reset signal Re is at a low level. Specifically, please refer to both FIG. 2 and FIG. 3. FIG. 3 shows a backlight driving circuit with a current path in the scan stage based on the driving sequence shown in FIG. 2. In the scan stage T1, the scan signal G is at a high level. Consequently, the second transistor T2 is turned on, and the data signal Da passes through the second node b to charge the storage capacitor C. Meanwhile, the reset signal Re is at a low level, causing the first transistor T1 to be turned off, so that the charges in the storage capacitor C are not escaped. The potential of the second node b is pulled to the high level, causing the gate to source voltage VGS of the driving transistor DT greater than a threshold voltage Vth, therefore the driving transistor DT is turned on, allowing the power signal VDD to power the light emitting device D. That is, a current is transmitted to the cathode of the light emitting device D through the anode of the light emitting device D, causing the light emitting device D to luminate.

The gate electrode source voltage VGS of the driving transistor DT refers to the potential difference between the second node b and the first node a, that is, the voltage difference between the gate electrode of the driving transistor DT and the source electrode of the driving transistor DT.

Figure 4:
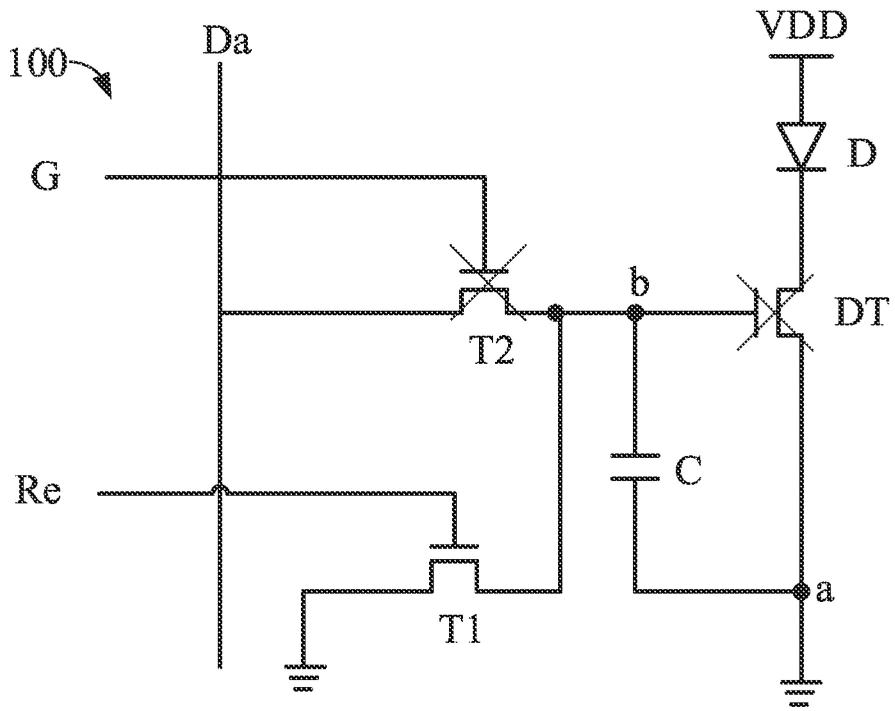
FIG. 4 is a path diagram of the reset stage of the backlight driving circuit according to the embodiment in the driving sequence shown in FIG. 2.

In some embodiments, in the reset stage T2, the scan signal G is at a low level and the reset signal Re is at a high level. Specifically, please refer to both FIG. 2 and FIG. 4. FIG. 4 shows a current path in the backlight driving circuit in a reset stage T2 according to an embodiment of the present application based on the driving sequence shown in FIG. 2. In the reset stage T2, the scan signal G is at a low level, causing the second transistor T2 to be turned off, such that the transmission of the data signal Da to the second node b is stopped. Meanwhile, the reset signal Re is at a high level, which turns on the first transistor T1, so that the first end and the second end of the storage capacitor C are grounded. Consequently, the storage capacitor C is discharged to the ground, that is, charges in the storage capacitor C are cleared (reset). As the potential of the second node b decreases, the gate to source voltage VGS of the driving transistor DT is less than the threshold voltage Vth. Therefore, the driving transistor DT is closed, the current circuit of the light emitting device D is cut off, and the light emitting device D stops illuminating.

Figure 5:
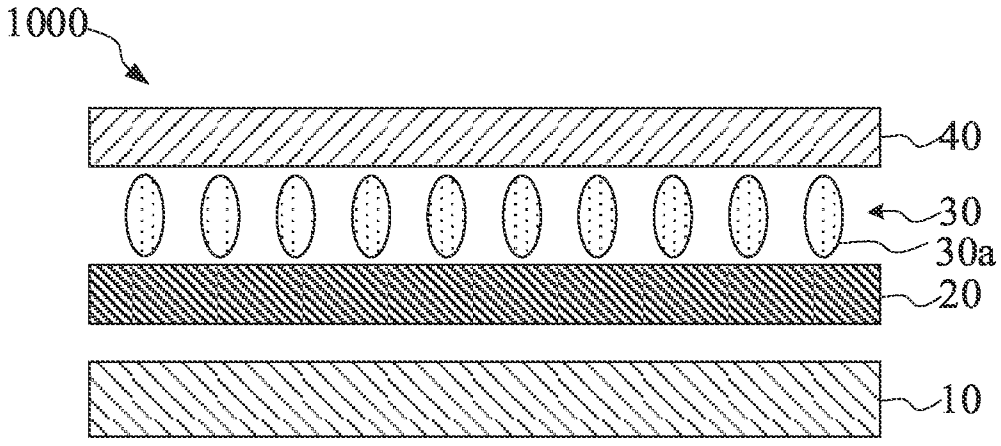
FIG. 5 is a structural diagram of the liquid crystal display device according to an embodiment of the present application.

A further embodiment of the present application provides a liquid crystal display device. Please refer to FIG. 5. FIG. 5 is a structural diagram of the liquid crystal display device according to an embodiment of the present application. The liquid crystal display device 1000 includes a backlight module 10, an array substrate 20, a color film substrate 40, and a liquid crystal layer 30 arranged between the array substrate 20 and the color film substrate 40. The backlight module 10 is arranged at one side of the array substrate 20 opposite to the liquid crystal layer 30, wherein the liquid crystal layer includes a plurality of rows of liquid crystal cell 30*a*. The backlight module 10 is provided with a plurality of rows of backlight unit, and each backlight unit includes a backlight driving circuit as described in the above embodiments. The backlight driving circuit is not shown in FIG. 5. The liquid crystal display device 1000 can also include pixel electrodes, common electrodes, or other devices. The detailed configuration modes and assembly of the liquid crystal display device 1000 are well-known technical means for those skilled in the art, and will not be described here.

Each row of the liquid crystal cells 30*a* in the liquid crystal layer 30 corresponds to 80 rows to 120 rows of backlight units. That is, each row of the liquid crystal cells 30*a* in the liquid crystal layer 30 corresponds to 80 rows to 120 rows of backlight driving circuit. Specifically, each row of the liquid crystal cells 30*a* in the liquid crystal layer 30 may be corresponded to 80 rows, 90 rows, 100 rows, 110 rows or 120 rows of the backlight driving circuits. Each row of the liquid crystal cells 30*a* in the liquid crystal layer 30 of the present application corresponds to 80 to 120 rows of backlight driving circuit, allowing the liquid crystal display device 1000 of the present application to be adaptable to the requirements of different pixel resolutions, and hence expanding the application market size of the liquid crystal display device 1000.

The liquid crystal display device 1000 according to an embodiment of the present application adopts a backlight driving circuit, which adds a first transistor and a reset signal. The on/off state of the second transistor T2 is controlled by the scan signal to charge the storage capacitor, and the on/off state of the first transistor is controlled by the reset signal to release charges in the storage capacitor. The liquid crystal display device 1000 according to an embodiment of the present application adopts the backlight driving circuit, allowing the backlight source to be turned on with the liquid crystal cells 30*a* row by row, so as to improve the problem of display motion streak effect.

Figure 6:
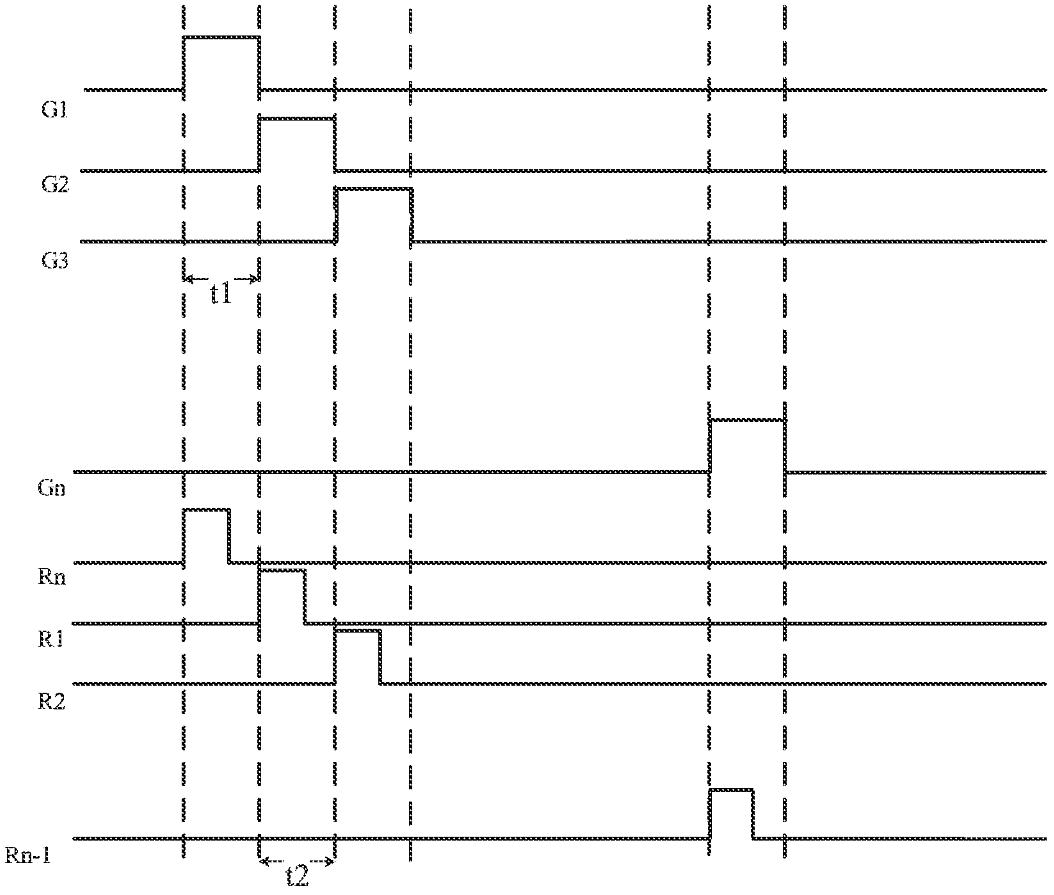
FIG. 6 is a driving circuit sequence diagram of the backlight module according to an embodiment of the present application.

Please refer to FIG. 6, wherein a driving circuit sequence diagram of the backlight module is presented according to an embodiment of the application. The following is explained in combination with FIG. 5 and FIG. 6. A drive timing sequence of the backlight driving circuit includes a scan stage T1 and a reset stage T2. In the scan stage T1, the n-th row of the liquid crystal cells 30*a* in the liquid crystal layer 30 is twisted (deflected). After the n-th row of the liquid crystal cells 30*a* is stabilized from the twisting, the backlight driving circuit drives the corresponding backlight unit in the backlight module to luminate. In the reset stage T2, charges stored in the backlight driving circuit are released, thereby, the backlight unit corresponding to the n-th row of liquid crystal cell is closed. Where n is a positive integer above 1. Among them, when the backlight driving circuit corresponding to the n+1-th row of the liquid crystal cells 30*a* is in the scan stage T1, the backlight driving circuit corresponding to the n-th row of the liquid crystal cells 30*a* is in the reset stage T2.

It should be noted that the scan stage T1 and the reset stage T2 indicated in FIG. 6 correspond to the first row scan signal G1 and the first row reset signal R1, and the potentials of other row scan signals and reset signals at this stage are correspondingly shown.

This application takes the backlight unit corresponding to the first and second rows of the liquid crystal cells 30*a* as an example. Firstly, in the scan stage T1, the backlight unit corresponding to the first row of liquid crystal cell the liquid crystal cells 30*a* is scanned and charged. When the first row of the liquid crystal cells 30*a* of the liquid crystal layer 30 finishes twisting and enters a stable state, the backlight unit corresponding to the first row of the liquid crystal cells 30*a* is charged to luminate. Meanwhile, the first row of screen is displayed. Thereafter, the backlight unit corresponding to the first row of the liquid crystal cells 30*a* enters the reset stage T2, wherein the charges in the storage capacitor C are cleared (reset), causing the backlight unit corresponding to the first row of the liquid crystal cells 30*a* to stop illuminating, so that the first row of picture stops displaying. Meanwhile, a backlight unit corresponding to the second row of the liquid crystal cells 30*a* is scanned and charged. When the second row of the liquid crystal cells 30*a* of the liquid crystal layer 30 finishes twisting and enters a stable state, the backlight unit corresponding to the second row of the liquid crystal cells 30*a* is charged to luminate. At this time, the second row of screen is displayed.

Thus, when the n-th row of the backlight units are turned on, the other rows of the backlight units are turned off, that is, an image is displayed row by row. The progressive display can ensure that the liquid crystal display device 1000 does not display an image during the twisting process of the liquid crystal cells 30*a*, so as to effectively improve the motion streak problem in the displayed image.

It should be noted that the liquid crystal display device 1000 includes a plurality of rows of the backlight units. Labels G1, G2, G3, . . . , and Gn represent the scan signals G corresponding to each row of the backlight units. Labels Rn, R1, R2, R3, . . . , and Rn−1 represent the reset signals Re corresponding to each row of the backlight units.

Specifically, please refer to FIG. 1, FIG. 2, FIG. 5, and FIG. 6 at the same time. In the scan stage T1, the scan signal G is high and the reset signal Re is low. In the scan stage T1, the first row of the liquid crystal cells 30*a* in the liquid crystal layer 30 is twisted under the driving of the pixel electrode and the common electrode. When the voltage between the pixel electrode and the common electrode reaches a preset value, the first row of the liquid crystal cells 30*a* are twisted stably. At the same time, the first row scan signal G1 is at a high level, so that the second transistor T2 in the backlight driving circuit 100 of the corresponding row of the backlight units are turned on. The data signal Da is written to the second node b, and the storage capacitor C in the backlight driving circuit 100 is charged. At this time, the potential of the second node b rises continuously. When the gate to source voltage VGS of the driving transistor DT is greater than the threshold voltage Vth, the driving transistor DT is turned on, and the power supply signal VDD supplies power to the light emitting device D in the corresponding row of the backlight units, causing the light emitting device D to luminate. Furthermore, at this time, the reset signal Re of the corresponding row of the backlight units are at a low level, therefore the first transistor T1 is turned off to prevent the charges in the storage capacitor C from draining out. As such, the corresponding row of the backlight units are turned on, and the first row of the image is displayed on the liquid crystal display device 1000.

The gate electrode source voltage VGS of the driving transistor DT refers to the potential difference between the second node b and the first node a, that is, the voltage difference between the gate electrode of the driving transistor DT and the source electrode of the driving transistor DT.

It should be noted that the backlight units corresponding to the successive rows of the liquid crystal cells 30*a* in the liquid crystal layer 30 can be analogously processed in the scan stage T1, and will not be described here.

In some embodiments, in the reset stage T2, the scan signal G is at a low level and the reset signal Re is at a high level. As shown in FIG. 1, FIG. 2, FIG. 5, and FIG. 6, in the reset stage T2, the scan signal G1 of the backlight unit corresponding to the first row of the liquid crystal cells 30*a* is at a low level, and the second transistor T2 in the backlight driving circuit 100 of the backlight unit corresponding to the first row of the liquid crystal cells 30*a* is turned off and stops transmitting the data signal Da to the second node b. Moreover, the reset signal R1 of the backlight unit corresponding to the first row of the liquid crystal cells 30*a* is at the high level, the first transistor T1 in the backlight driving circuit 100 of the backlight unit corresponding to the first row of the liquid crystal cells 30*a* is turned on, and the first end and the second end of the storage capacitor C in the backlight driving circuit 100 of the backlight unit corresponding to the first row of the liquid crystal cells 30*a* are grounded, so that the storage capacitor C is discharged to the ground and the charge in the storage capacitor C is cleared. The potential of the second node b drops, and the gate to source voltage VGS of the driving transistor DT in the backlight driving circuit 100 of the backlight unit corresponding to the first row of the liquid crystal cells 30*a* is less than the threshold voltage Vth. Therefore, the driving transistor DT is turned off, the current loop of the light emitting device D in the backlight driving circuit 100 of the backlight unit corresponding to the first row of the liquid crystal cells 30*a* is cut off, and the light emitting device D stops emitting light. At this time, the backlight unit corresponding to the first row of the liquid crystal cells 30*a* is turned off, and the first row of the image stops being displayed in the liquid crystal display device 1000.

It should be noted that the backlight units corresponding to successive rows of the liquid crystal cells 30*a* in the liquid crystal layer 30 are analogously processed in the reset stage T2, and will not be described here.

While the backlight unit corresponding to the first row of liquid crystal cell the liquid crystal cells 30*a* is in the reset stage T2, the backlight unit corresponding to the second row of liquid crystal cells 30*a* enters the scan stage. In this way, on one hand, the backlight can be turned on after the liquid crystal cell is deflected (twisted) to a steady state; on the other hand, the backlight unit can be turned on following the deflection of the liquid crystal cells row by row, so as to improve the motion streak problem in a displayed image of the liquid crystal display device 1000, enhance the product quality, and improve the display effect.

Moreover, in the related technology, if an active matrix LCD needs to be illuminated row by row, a conventional approach was to scan the whole screen, and then display row by row. The liquid crystal display device 1000 according to an embodiment of the present application realizes progressive scanning and progressive illumination, which can reduce power consumption, reduce charging time, and expand product application scenarios.

The liquid crystal display device 1000 of the application can be applied to an AMLED backlight LCD, an AM-mini-LED backlight LCD, or an AM-micro-LED backlight LCD. The liquid crystal display device 1000 can be a mobile phone, a tablet computer, a notebook, a game machine, a digital camera, a vehicle navigator, an electronic billboard, an ATM, and other electronic devices with display function.

A backlight driving circuit and a liquid crystal display device according to an embodiment of the present application are described in detail above. In this paper, a specific example is applied to describe the principle and implementation mode of the application. The description of the above embodiment is only used to help understand the method and the core idea of the application. Meanwhile, for those skilled in the art, according to the idea of the application, there may be changes in the modes of implementation and the scopes of application. To sum up, the contents of this specification shall not be interpreted as limiting the application.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A backlight driving circuit, comprising:

a driving transistor;

a first transistor;

a second transistor;

a storage capacitor; and a light emitting device, wherein:

a drain of the driving transistor is electrically connected with the light emitting device, a source of the driving transistor is electrically connected with a first node, and a gate of the driving transistor is electrically connected with a second node;

a drain of the first transistor is grounded, a source of the first transistor is electrically connected to the second node, and a gate of the first transistor is connected with a reset signal;

a source of the second transistor is connected with a data signal, a drain of the second transistor is electrically connected with the second node, and a gate of the second transistor is connected with a scan signal;

a first end of the storage capacitor is electrically connected to the first node, and a second end of the storage capacitor is electrically connected to the second node, an anode of the light emitting device is connected with a power supply signal, and a cathode of the light emitting device is electrically connected with the drain of the driving transistor;

a drive timing sequence of the backlight driving circuit comprises a scan stage and a reset stage;

in the scan stage, the data signal is output to the second node, and the driving transistor drives the light emitting device to luminate;

in the reset stage, the charge of the storage capacitor is released to reset the light emitting device; and the reset signal of the n-th row corresponds to a high voltage level when the scan signal of the (n+1)-th row corresponds to a high voltage level such that the reset stage of n-th row is overlapped with the scan stage of (n+1)-th row, and n is an integer greater than 1.

2. The backlight driving circuit according to claim 1, wherein in the scan stage, the scan signal is at a high level and the reset signal is at a low level.

3. The backlight driving circuit according to claim 1, wherein in the reset stage, the scan signal is at a low level and the reset signal is at a high level.

4. The backlight driving circuit according to claim 1, wherein the first transistor, the second transistor and the driving transistor are low temperature polysilicon thin film transistors, oxide semiconductor thin film transistors, or amorphous silicon thin film transistors.

5. The backlight driving circuit according to claim 1, wherein the light-emitting device is one or more of light-emitting diodes, mini light-emitting diodes, and micro light-emitting diodes.

6. A backlight driving circuit, comprising:

a driving transistor;

a first transistor;

a second transistor;

a storage capacitor; and a light-emitting device, wherein:

the light-emitting device is one or more of light-emitting diodes, mini light-emitting diodes, and micro light-emitting diodes;

a drain of the driving transistor is electrically connected with the light emitting device, a source of the driving transistor is electrically connected with a first node, and a gate of the driving transistor is electrically connected with a second node;

a drain of the first transistor is grounded, a source of the first transistor is electrically connected to the second node, and a gate of the first transistor is connected with a reset signal;

a source of the second transistor is connected with a data signal, a drain of the second transistor is electrically connected with the second node, and a gate of the second transistor is connected with a scan signal;

a first end of the storage capacitor is electrically connected to the first node, and a second end of the storage capacitor is electrically connected to the second node; and an anode of the light emitting device is connected with a power supply signal, and a cathode of the light emitting device is electrically connected with the drain of the driving transistor;

a drive timing sequence of the backlight driving circuit comprises a scan stage and a reset stage;

in the scan stage, the data signal is output to the second node, and the driving transistor drives the light emitting device to luminate;

in the reset stage, the charge of the storage capacitor is released to reset the light emitting device; and the reset signal of the n-th row corresponds to a high voltage level when the scan signal of the (n+1)-th row corresponds to a high voltage level such that the reset stage of n-th row is overlapped with the scan stage of (n+1)-th row, and n is an integer greater than 1.

7. The backlight driving circuit according to claim 6, wherein:

in the scan stage, the scan signal is at a high level, and the reset signal is at a low level; and in the reset stage, the scan signal is at the low level and the reset signal is at the high level.

8. The backlight driving circuit according to claim 6, wherein the first transistor, the second transistor, and the driving transistor are low temperature polysilicon thin film transistors.

9. The backlight driving circuit according to claim 6, wherein the first transistor, the second transistor, and the driving transistor are oxide semiconductor thin film transistors.

10. The backlight driving circuit according to claim 6, wherein the first transistor, the second transistor and the driving transistor are amorphous silicon thin film transistors.

11. A liquid crystal display device, comprising:

a backlight module;

an array substrate;

a color film substrate; and a liquid crystal layer arranged between the array substrate and the color film substrate, wherein:

the backlight module is arranged on the side of the array substrate away from the liquid crystal layer; and the backlight module is provided with a plurality of backlight units;

each of the backlight units comprises a driving transistor, a first transistor, a second transistor, a storage capacitor and a light emitting device;

a drain of the driving transistor is electrically connected with the light emitting device, a source of the driving transistor is electrically connected with the first node, a gate of the driving transistor is electrically connected with the second node;

a drain of the first transistor is grounded, a source of the first transistor is electrically connected to the second node, and a gate of the first transistor is connected with a reset signal;

a source of the second transistor is connected with a data signal, a drain of the second transistor is electrically connected with the second node, and a gate of the second transistor is connected with a scan signal;

a first end of the storage capacitor is electrically connected to the first node, and a second end of the storage capacitor is electrically connected to the second node;

an anode of the light emitting device is connected with a power supply signal, and a cathode of the light emitting device is electrically connected with the drain of the driving transistor;

a drive timing sequence of the backlight driving circuit comprises a scan stage and a reset stage;

in the scan stage, the data signal is output to the second node, and the driving transistor drives the light emitting device to luminate;

in the reset stage, the charge of the storage capacitor is released to reset the light emitting device; and the reset signal of the n-th row corresponds to a high voltage level when the scan signal of the (n+1)-th row corresponds to a high voltage level such that the reset stage of n-th row is overlapped with the scan stage of (n+1)-th row, and n is an integer greater than 1.

12. The liquid crystal display device according to claim 11, wherein:

in the scan stage, the n-th row of a plurality of liquid crystal cells in the liquid crystal layer is twisted;

after the n-th row of the liquid crystal cells is stabilized, the backlight driving circuit drives a corresponding backlight unit in the backlight module to luminate; and in the reset stage, charges stored in the backlight driving circuit are released, and each of the backlight units corresponding to the n-th row of the liquid crystal cells is turned off, where n is a positive integer greater than 1.

13. The liquid crystal display device according to claim 12, wherein each row of the liquid crystal cells corresponds to 80 to 120 rows of the backlight unit.

14. The liquid crystal display device according to claim 11, wherein: in the scan stage, the data signal is output to the second node, and the driving transistor drives the light emitting device to luminate; and in a reset stage, the charge of the storage capacitor is released to reset the light emitting device.

15. The liquid crystal display device according to claim 14, wherein in the scan stage, the scan signal is at a high level, and the reset signal is at a low level.

16. The liquid crystal display device according to claim 14, wherein in the reset stage, the scan signal is at a low level, and the reset signal is at a high level.

17. The liquid crystal display device according to claim 11, wherein the first transistor, the second transistor, and the driving transistor are low temperature polysilicon thin film transistors, oxide semiconductor thin film transistors, or amorphous silicon thin film transistors.

18. The liquid crystal display device according to claim 11, wherein the light emitting device is one or more of light emitting diodes, mini light emitting diodes, and micro light emitting diodes.

* * * * *